Feb. 18, 1947.　　　A. H. SIEMEN　　　2,416,123
CORN PICKER ROLLER
Filed May 17, 1944　　　2 Sheets-Sheet 1
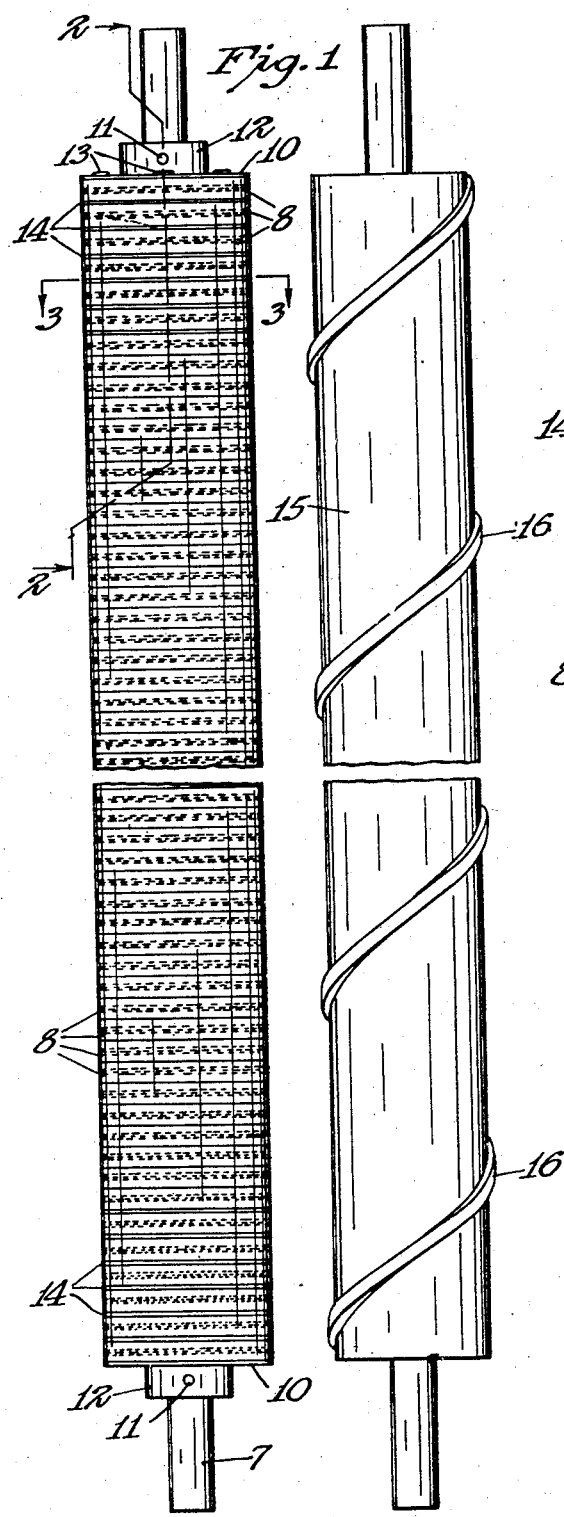
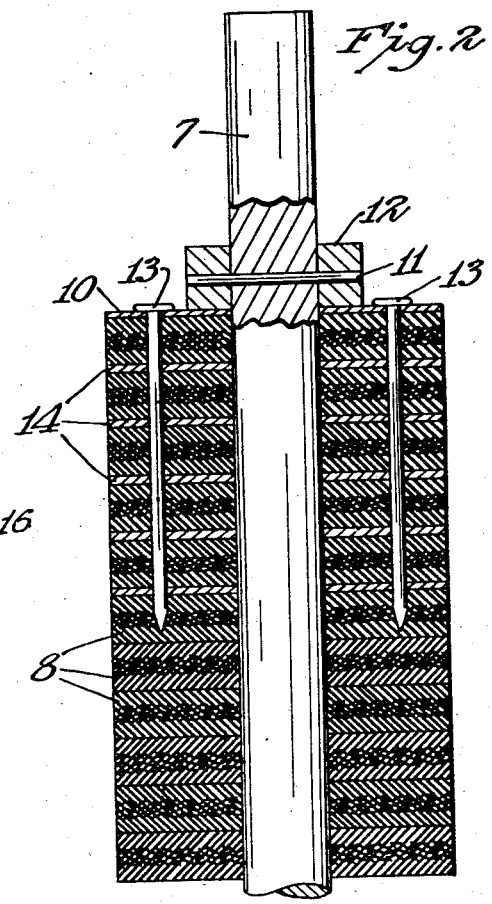
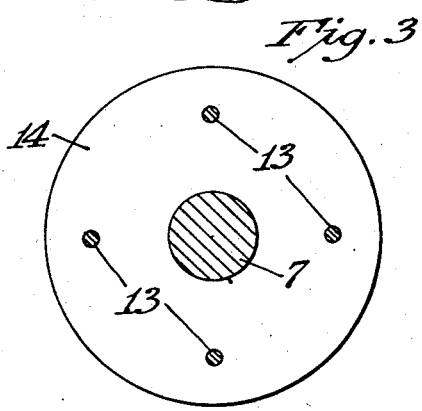
Inventor
Albert H. Siemen
By Merchant & Merchant
Attorneys Feb. 18, 1947.  A. H. SIEMEN  2,416,123
CORN PICKER ROLLER
Filed May 17, 1944  2 Sheets-Sheet 2

Inventor
Albert H. Siemen
By Merchant & Merchant
Attorneys

Patented Feb. 18, 1947

2,416,123

UNITED STATES PATENT OFFICE 2,416,123

CORN PICKER ROLLER

Albert H. Siemen, Appleton, Minn.

Application May 17, 1944, Serial No. 535,963

8 Claims. (Cl. 130—5)

My invention relates to new and useful improvements in rollers adapted for use on various types of machinery, such as corn shredders or pickers and the like.

The principal object of my invention is to provide a flexible or resilient roll, which will permit a much greater purchase on the corn and other like material being run between the rollers.

Another object of my invention is to provide a roll for corn pickers and the like which has greater wearing qualities than any rollers heretofore developed.

Another important object of my invention is to provide a cushion roll which can be manufactured from old discarded material such as pneumatic automobile tire casing and which in operation will be much more efficient than the solid steel rollers heretofore employed and cost much less to manufacture.

Another object of my invention is to provide, in combination with my novel laminated rubber or resilient roll, a steel roll of novel design.

Other objects and advantages of the invention will be apparent from the following description.

Referring to the drawings, in which like characters indicate like parts throughout the several views:

Fig. 1 is a top elevation of a pair of cooperating rolls, one a laminated roll of my novel design and the other a steel roll also of novel design;

Fig. 2 is an enlarged fragmental sectional view taken on the line 2—2 of Fig. 1, some parts, on the section line, being shown in full;

Fig. 3 is also an enlarged sectional view taken on the line 3—3 of Fig. 1;

Figure 4:
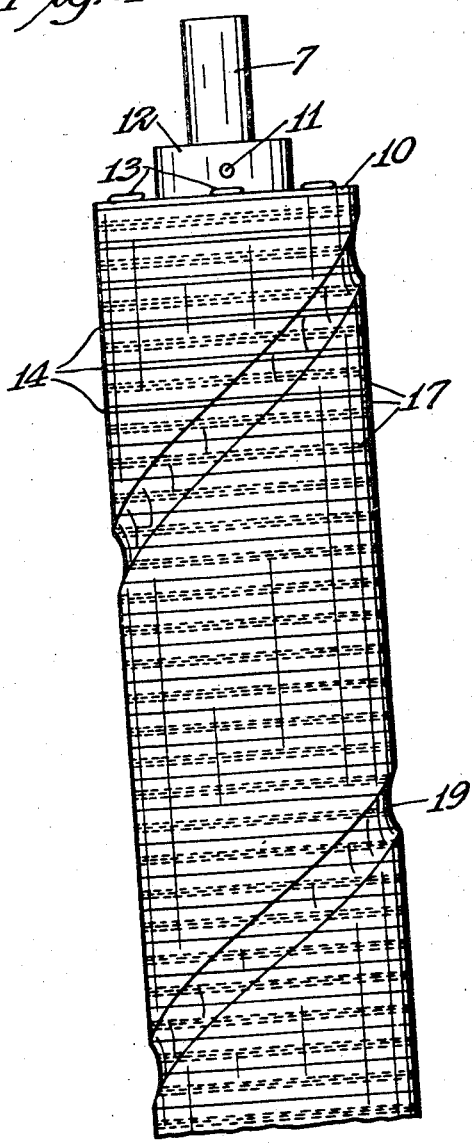
Fig. 4 is a top elevation of a modified laminated roll.

In constructing my laminated resilient roller I use an elongated shaft 7 onto which are placed the desired number of resilient discs 8.

Discs 8 are preferably made from materials having the qualities of rubber, either crude or synthetic, and have embedded therein cords of cotton, rayon, nylon or the like. In practice these discs could be made of new material but it is believed that old discarded material such as pneumatic automobile tire carcasses, will prove not only adequate to fill the need, but also a much cheaper source.

Discs 8 are provided with centrally located openings 9 of such a size as to make a snug fit on the shaft 7.

When sufficient number of discs 8 have been placed on the shaft 7, metal end plates 10 are placed over each end of the shaft and the end plates and discs pressed together by mechanical means to a point where pins 11 are capable of being driven through aligned openings in the collars 12 and shaft 7.

Because the discs are tightly pressed together they frictionally engage each other to such an extent that they do not rotate with respect to one another even under most difficult tests. Any tendency toward such movement is towards the ends, and for this reason I find it desirable to drive circumferentially spaced anchor pins 13, shown as in the form of wire nails, through the metal end plates and thence through a number of the discs 8. Anchor pins 13 are shown as parallel to shaft 7.

In practice I have found that the greatest amount of wear, particularly in a corn picker roller, is towards its ends; I have found that a very effective method of reducing this wear, and thus prolonging the life of the roll, is to insert flexible sheet metal discs 14 alternately between the resilient discs 8 for that length of the roll where the wear is greatest.

In Fig. 1, I have shown a common solid steel roll 15 having a steel or other metal raised rib 16 extending from end to end in a spiral manner. I have found this type of metal roller, which I believe to be of novel design, to be most effective when working together with my novel composite laminated roller.

Figure 5:
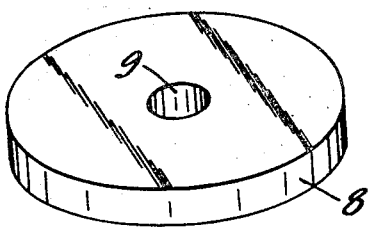
Fig. 5 is a perspective of one of the laminations or discs making up rolls of the type shown in Fig. 1.
Figure 6:
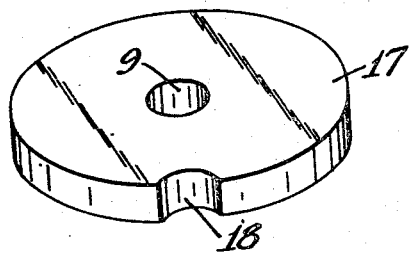
Fig. 6 is a perspective of one of the laminations or discs making up the roller shown in Fig. 4.

The modified disc 17 shown in Fig. 6 is of the same general type as shown in Fig. 5, but has at its peripheral edge, a segmental notch 18. As shown in Fig. 4 these resilient discs 17 together with the sheet metal discs 14, if and where the same are used, are so arranged before compressing the laminations together that the notches 18 make a spiral groove 19 from one end of the roller to the other.

For certain types of work, these spirally grooved rollers are superior to the roller illustrated in Figs. 1 and 2. Furthermore, two of these rollers may be run side by side, thus eliminating the metal roller.

In accordance with the patent statutes I have disclosed a complete machine or device for the purposes had in view, but it will be understood that the same is capable of various modifications all within the scope of the invention herein disclosed and broadly claimed.

What I claim is:

1. A roller comprising an elongated cylindrical shaft, and a laminated roller body, said body comprising a plurality of flexible discs positioned in side face engagement and having circular central apertures receiving said shaft, means cooperating with the shaft adjacent opposite ends thereof and the endmost discs for clampingly engaging the end faces of the discs under compression, and a plurality of pins extending from opposite ends of the body and through only several of the endmost discs thereof.

2. A roller comprising an elongated shaft, and a laminated roller body mounted on the shaft, said body throughout the major and central portion of its length comprising a plurality of rubber impregnated fabric discs, and the end portions of the body comprising alternately arranged rubber impregnated fabric discs and relatively thin flexible metal discs, each of said discs being provided with an arcuate walled notch in its periphery, said discs being mounted on the shaft with the notches therein aligned in the formation of a spiral groove extending from one end to the other of the roller body.

3. A roller comprising an elongated cylindrical shaft, and a laminated cylindrical roller body, said body comprising a plurality of rubber impregnated fabric discs each having a central aperture receiving said shaft, said discs being arranged at right angles to the shaft, relatively thin flexible sheet metal discs having central shaft receiving apertures disposed between several of the fabric discs adjacent each end of the body, means cooperating with the shaft adjacent opposite ends thereof and the end-most discs for clampingly engaging the end pieces of the discs under compression and a plurality of pins extending into opposite ends of the body parallel with said shaft and penetrating only several of the endmost discs together with the interposed sheet metal discs for preventing relative movement of the discs adjacent the ends of the body.

4. A roller comprising an elongated cylindrical shaft, and a laminated cylindrical roller body, said body comprising a plurality of rubber impregnated fabric discs each having a central aperture receiving said shaft, said discs being arranged at right angles to the shaft, relatively thin flexible sheet metal discs having central shaft receiving apertures disposed between several of the fabric discs adjacent each end of the body, and a groove in said body extending spirally from one end thereof to the other.

5. A roller comprising an elongated cylindrical shaft, and a laminated roller body, said body comprising a plurality of flexible discs having embedded therein reinforcing fiber cords extending to the peripheries of the discs circumferentially thereof and said discs being positioned in side face engagement and having central apertures receiving said shaft, and means cooperating with the shaft adjacent opposite ends thereof and the endmost discs for clampingly engaging the end faces of the discs under compression, each of said discs being provided with a peripheral notch, said discs being mounted on the shaft so that the notch of each disc is circumferentially spaced with respect to the notch of the immediately adjacent disc.

6. A corn husking roller comprising an elongated rigid shaft and a laminated cylindrical roller body axially fixed thereto, said body comprising a multiplicity of somewhat compressible discs constructed of rubber having embedded therein reinforcing fiber cords extending to the peripheries of the discs circumferentially thereof, said discs having central apertures for receiving said shaft and being of substantially uniform thickness and diameter and presenting contiguous frictional husk-engaging peripheral edges throughout the length of the roller, and means for longitudinally clamping said discs together and affixing the same to said shaft.

7. A corn husking roller adapted for cooperation with a generally cylindrical non-compressible roller comprising an elongated rigid shaft, a multiplicity of discs axially mounted on said shaft and of substantially uniform thickness, means for clamping said discs tightly together, face to face, upon said shaft to fix the same to said shaft and to prevent relative movement of said discs during rotation of said shaft, said discs being constructed of rubber material having embedded therein reinforcing fiber cords, said cords extending to the peripheries of the discs and presenting frictional husk-engaging peripheral edges circumferentially of the discs, the peripheral edges of said several discs forming contiguous frictional husk-gripping surfaces throughout the length of the roller.

8. A corn husking roller comprising an elongated rigid shaft and a laminated cylindrical roller roller body axially fixed thereto, said body comprising a multiplicity of discs cut from rubber tire carcass material so that the fiber cords of the material extend to the peripheries of the discs circumferentially thereof, said discs having central apertures for receiving said shaft and being of substantially uniform thickness and diameter and presenting contiguous frictional husk-engaging peripheral edges throughout the length of the roller, and means for longitudinally clamping said discs together and affixing the same to said shaft.

ALBERT H. SIEMEN.

REFERENCES CITED

The following references are of record in the file of this patent:

UNITED STATES PATENTS

| Number | Name | Date |
| --- | --- | --- |
| 2,308,102 | Paradise et al. | Jan. 12, 1943 |
| 619,231 | Rupp | Feb. 7, 1899 |
| 104,826 | Chamberlain | June 22, 1870 |
| 1,002,530 | Legg et al. | Sept. 5, 1911 |
| 2,266,506 | Morse | Dec. 16, 1941 |
| 1,921,672 | Haushalter | Aug. 8, 1933 |
| 81,631 | Hartnett | Sept. 1, 1868 |
| 2,111,364 | Hopkins | Mar. 15, 1938 |